Figure 1:
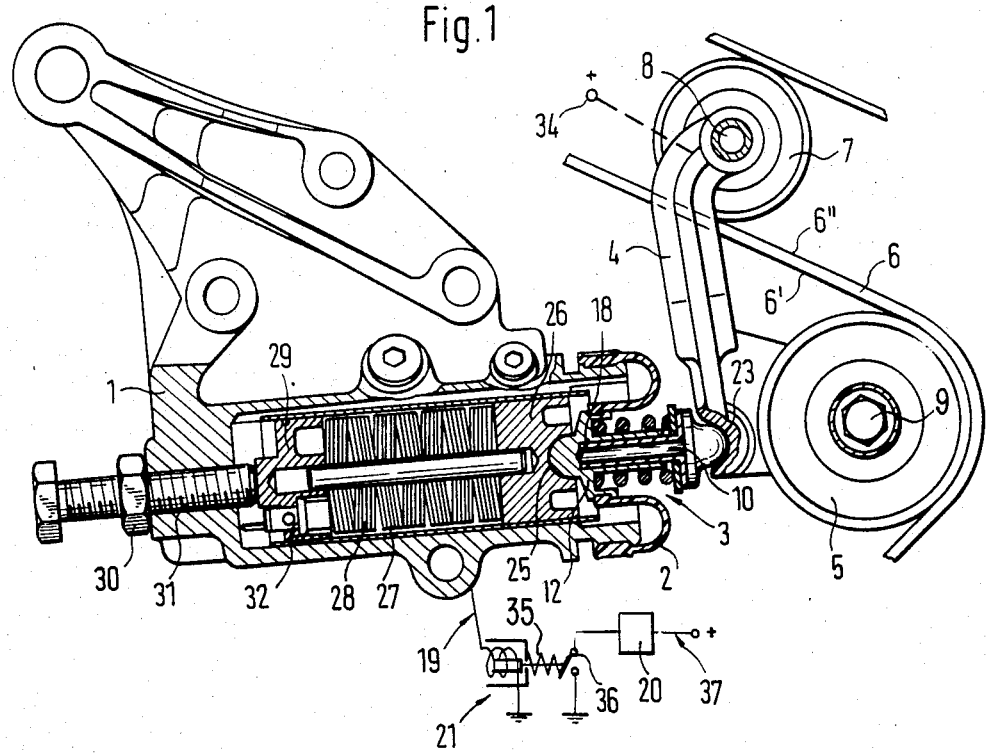

United States Patent [19]

Schulze

[11] Patent Number: 4,573,952

[45] Date of Patent: Mar. 4, 1986

[54] TENSIONING DEVICE WITH A CONTROL MECHANISM FOR THE TENSION OF A BELT

[75] Inventor: Heinz Schulze, Stuttgart, Fed. Rep. of Germany

[73] Assignee: Dr. Ing. h.c.F. Porsche A.G., Fed. Rep. of Germany

[21] Appl. No.: 575,891

[22] Filed: Feb. 1, 1984

[30] Foreign Application Priority Data

Feb. 10, 1983 [DE] Fed. Rep. of Germany ....... 3304543

[51] Int. Cl.[4] ............................................. F16H 7/08
[52] U.S. Cl. ..................................... 474/110; 474/133
[58] Field of Search ............... 474/101, 102, 133, 135, 474/137, 139, 110; 340/676, 675, 677, 686

[56] References Cited

U.S. PATENT DOCUMENTS 3,044,052  7/1962  Marsh ................................. 340/668
3,418,627  12/1968  Lyons ............................. 340/686 X
3,465,607  9/1969  Erdman ......................... 474/137 X
3,736,032  5/1973  Mosshart et al. ............... 474/110 X Primary Examiner—James A. Leppink
Assistant Examiner—Frank McKenzie
Attorney, Agent, or Firm—Craig and Burns

[57] ABSTRACT

A belt tensioning installation with a control device for the belt tension, which serves to monitor the tension of a belt, especially of a toothed belt, in order to prevent the relative position between driving and driven toothed belt pulley as a result of an excessive decrease of the belt tension. For that purpose an electric contact place is formed on a pressure element by way of which a tensioning roller is pressed against the toothed belt; the contact place is opened by spring force in case of a non-permissively reduced belt tension. An energizing circuit which includes the contact place is thereby interrupted and an optical or acoustic warning signal is triggered at an indicating apparatus by way of a relay.

14 Claims, 2 Drawing Figures

U.S. Patent   Mar. 4, 1986   4,573,952

TENSIONING DEVICE WITH A CONTROL MECHANISM FOR THE TENSION OF A BELT

The present invention relates to a tensioning installation having a device for controlling the tension of a belt, especially of a toothed belt, with a tensioning roller that is pressed against the toothed belt by way of a pressure element longitudinally displaceable in a tightener housing.

If toothed belts are tightened excessively, they produce very unpleasant high-frequency noises as a result of the polygon effect. One therefore aims at maintaining the belt tension as low as possible. This, however, entails the danger that in case of a sudden, jerk-like load, a tooth is skipped. This danger increases further with an increase in the operating hours of the belt since its tension decreases as a result of wear and settling phenomena. Especially in those cases in which the relative position between the driving pulley and the driven toothed belt pulley must be preserved under all conditions, for example, with the drive of the cam shaft of an internal combustion engine and of the balancing masses by the crankshaft, it is necessary to take care for an adequate belt tension and to monitor the same by a control device.

It is known from the U.S. Pat. No. 3,465,607 to indicate the operationally conditioned lengthening of a belt on a graduation arranged adjacent thereto in order to provide an indication when a retightening or retensioning of the belt is necessary. It is thereby disadvantageous that such a graduation is frequently forgotten to be read. Frequently, belt drives are also so poorly accessible that a reading of the tension indication is possible only with difficulty.

The task of the present invention resides in providing a belt tensioning installation adapted to be manufactured in a cost-favorable manner with a mechanism for controlling the tension of a belt which, in case of an inadequate belt tension, produces an optical or acoustic signal as warning indication and thus urges the retensioning of the belt.

The underlying problems are solved according to the present invention in that an electric contact place responding to the tensioning force is formed in the pressure element of the tensioning installation, which in case of a non-permissively reduced tension of the toothed belt triggers a warning signal for an indicating apparatus. An electric circuit which is normally closed can be interrupted at a contact place which is arranged in a pressure element acting on the tensioning roller and a warning signal can be triggered in this manner at an indicating apparatus. According to another feature of the present invention, the contact place is opened with a decreasing belt tension by a compression spring which is matched to the respectively required tension of the belt.

According to still further features of the present invention, the pressure element may be formed of an electrically conducting contact pin, an insulating sleeve fixed and centered thereon, an electrically conducting contact sleeve longitudinally guided on the insulating sleeve and a prestressed compression spring prestressed between the collar of the insulating sleeve and a recess of the contact sleeve, whereby the contact place is located between the end face of the contact pin and the conical bottom of the contact sleeve. These and other features of the present invention to be described more fully hereinafter provide a control device which can be manufactured with low expenditures. The contact place is integrated into the tensioning installation and is accommodated therein completely protected so that a trouble-free operation is assured.

Figure 2:
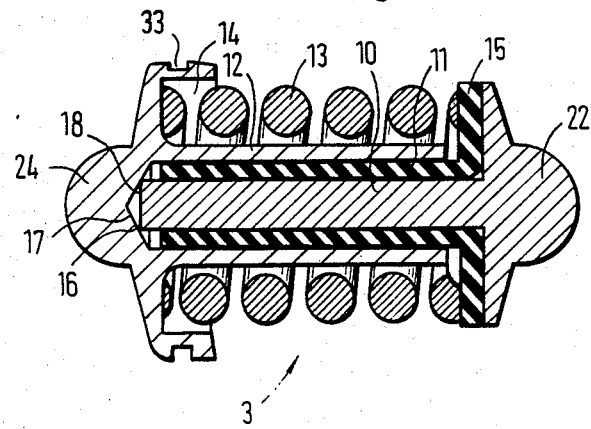

These and other objects, features and advantages of the present invention will become more apparent from the following description when taken in connection with the accompanying drawing which shows, for purposes of illustration only, one embodiment in accordance with the present invention and wherein:

FIG. 1 is an elevational view, partly in cross section, of a belt-tensioning installation with a control device in accordance with the present invention; and FIG. 2 is a cross-sectional view, on an enlarged scale, through the pressure element with contact place in accordance with the present invention.

Referring now to the drawing wherein like reference numerals are used throughout the two views to designate like parts, a roller bellows 2 is secured on the outside of a tensioner housing 1, whose other end is connected with a pressure element generally designated by reference numeral 3 which keeps a toothed belt 6 (the teeth not being shown) under tension by way of a tensioning roller support 4 and a roller 5 rotatably supported thereon. The tensioning roller 5 is pressed against the outside 6' of the toothed belt 6 while a quieting roller 7 rolls off along the inside 6" thereof, whose bearing place 8 is arranged on the tensioning roller support 4 approximately at a right angle to the bearing place 9 of the tensioning roller 5, which is disposed in the axial direction of the tensioner housing 1.

As is clearly shown in FIG. 2, the pressure element 3 includes a contact pin 10, an insulating sleeve 11 centered and secured thereon, which is longitudinally guided within a contact sleeve 12 and a compression spring 13 which is inserted between a recess 14 of the contact sleeve 12 and a collar 15 of the insulating sleeve 11. The electrically conducting contact pin 10 abuts with its end face at the conical bottom 17 of the electrically conducting contact sleeve 12 and forms together with the same a contact place 18, by means of which an electric circuit 19 with a relay 21 is adapted to be controlled. If the relay 21 becomes de-energized, then a switch 36 of a further electric circuit 37 in which an indicating apparatus 20 is connected, is closed by a spring 35.

The contact pin 10 includes a spherically shaped head 22 which abuts in a spherical socket 23 of the tensioning roller support 4. A spherically shaped head 24 of the contact sleeve 12 is located coaxially thereto in a spherically shaped socket 25 of a piston 26 which is longitudinally guided in the tensioner housing 1 and is supported against packets 27 of bimetallic springs 28. Five of the dish-shaped bimetallic springs 28 each are stacked with their convex sides one within the other to form each packet 27. Two such packets 27 rest against one another with their concave sides and form a spring pair. The temperature-conditioned changes of the toothed belt length and of the toothed belt tension is compensated for by the bimetallic springs 28. The entire unit of the several packets 27 is supported against a disk 29 centered in the tensioner housing 1, which disk is stopped by an adjusting bolt 31 screwed into the tensioner housing 1 from the outside and secured by means of a nut 30 and which is adjustable for changing the prestress of the bimetallic springs 28. The tensioner housing 1 is filled with a hydraulic oil which acts upon the piston 26 and in addition to the spring stress, effects a hydraulic damping of the tensioning installation. The roller bellows 2 serves for sealing and accommodating the longitudinal movements between the tensioner housing 1 and the pressure element 3, which, on the one hand, is retained on the tensioner housing 1 and, on the other, in an annular groove 33 of the contact sleeve 12.

As long as the tension of the toothed belt is sufficiently high, the compression spring 13 which is designed for an end force of 400N, is compressed to such an extent that the end face 16 of the contact pin 10 abuts at the conical bottom 17 of the contact sleeve 12. Current flows by way of the thus-closed contact place 18 from the positive terminal 34 to ground by way of the electric circuit 19 formed by the tension roller support 4, the pressure element 3, the piston 26, the tensioner housing 1 and the relay 21; the indicating apparatus thereby does not respond. Before the tension of the toothed belt 6 has decreased so far that a skipping by one tooth has to be feared, the compression spring 13 opens the contact place 18 and interrupts the electric circuit 19. The relay 21 becomes de-energized and drops off and thus triggers a switching signal at the indicating apparatus 20 which produces an optical or acoustic warning signal and directs attention to the inadequate belt tension.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A tensioning installation with a device for controlling the tension of a belt, comprising tensioning roller means, a tensioner housing means, and pressure means, the tensioning roller means being pressed against the belt by way of the pressure means being longitudinally displaceable within the tensioner housing means, said pressure means including an electric contact means responding to the tensioning force, said contact means being operable to trigger a warning signal at an indicating apparatus in case of a non-permissively reduced tension of the belt, said pressure means including said electric contact means having an electrically conducting contact pin, an insulating sleeve centered and fixed on the contact pin, an electrically conducting contact sleeve longitudinally guided on the insulating sleeve, and a compression spring stressed between a collar of the insulating sleeve and a recess of the contact sleeve, the contact means being located between an end face of the contact pin and a conical bottom of the contact sleeve.

2. A tensioning installation according to claim 1, wherein the contact means is opened in case of a decreasing belt tension by the force of the compression spring and is thereby operable to interrupt an electric circuit connected to the contact means and thus produces the warning signal.

3. A tensioning installation according to claim 2, wherein the pressure means is secured at the tensioner housing means by way of a roller bellows means which is retained in an annular groove of the contact sleeve.

4. A tensioning installation according to claim 1, wherein the pressure means is secured to the tensioner housing means by way of a roller bellows means which is retained in an annular groove of the contact sleeve.

5. A tensioning installation according to claim 4, wherein the contact pin is provided with a spherically shaped head portion that rests in a spherically shaped socket of a tensioning roller support means serving for the rotatable support of the tensioning roller means.

6. A tensioning installation according to claim 5, a quieting roller means is rotatably supported on the support means approximately at a right angle to the tensioning roller means, said quieting roller means rolling off along the inside of the belt whereas the tensioning roller means is pressed against the outside of the belt.

7. A tensioning installatin according to claim 6, wherein the contact sleeve includes a spherically shaped head, which abuts in a spherically shaped socket of a piston means longitudinally movably guided in the tensioner housing means and supported by several packets of bimetallic springs.

8. A tensioning installation according to claim 7, wherein the piston means is supported by several packets of bimetallic springs and is acted upon by pressure oil for damping purposes.

9. A tensioning installation according to claim 1, wherein the contact pin is provided with a spherically shaped head portion that rests in a spherically shaped socket of a tensioning roller support means serving for the rotatable support of the tensioning roller means.

10. A tensioning installation according to claim 9, wherein a quieting roller means is rotatably supported on the support means approximately at a right angle to the tensioning roller means, said quieting roller means rolling off along the inside of the belt whereas the tensioning roller means is pressed against the outside of the belt.

11. A tensioning installation according to claim 1, wherein the contact sleeve includes a spherically shaped head, which abuts in a spherically shaped socket of a piston means longitudinally movably guided in the tensioner housing means and supported by several packets of bimetallic springs.

12. A tensioning installation according to claim 11, wherein the piston means is supported by several packets of bimetallic springs and is acted upon by pressure oil for damping purposes.

13. A tensioning installation according to claim 11, wherein the contact pin is provided with a spherically shaped head portion that rests in a spherically shaped socket of a tensioning roller support means serving for the rotatable support of the tensioning roller means.

14. A tensioning installation according to claim 1, wherein a quieting roller means is rotatably supported on a support means approximately at a right angle to the tensioning roller means, said quieting roller means rolling off along the inside of the belt whereas the tensioning roller means is pressed against the outside of the belt.

* * * * *